Patented Mar. 20, 1945

2,372,116

UNITED STATES PATENT OFFICE 2,372,116

AMINO ALCOHOL ESTERS

John S. Pierce, Jason M. Salsbury, and James M. Fredericksen, Richmond, Va.; said Salsbury and said Fredericksen assignors to said Pierce No Drawing. Application March 24, 1942,
Serial No. 436,060

16 Claims. (Cl. 260—473)

This invention relates to amino alcohol esters and to processes for their preparation.

The principal object of the invention is to prepare a series of compounds of this nature which have valuable pharmacological properties and are useful local anesthetics, particularly for topical application. A further object is to provide simple methods of manufacturing these compounds.

We have developed a new series of chemical substances which are, generally speaking, alkoxy-benzoic acid esters of secondary amino alcohols. One embodiment of this invention in which we are particularly interested comprises compounds of the structure

where R is an alkyl radical, X and Y are members of the group hydrogen and an alkyl radical, and Z is a primary alkyl radical. Our invention pertains to and comprises not only the compounds referred to, but also the salts of such compounds.

Our new compounds may be made by ester formation from the acid and alcohol parts of the molecules desired. We obtain excellent results by adding an alkoxybenzoyl chloride to the dry hydrochloride of the amino alcohol,

by heating for one hour on a water bath or a shorter time at a higher temperature, and by isolation of the desired ester from the reaction mixture. Also, our anesthetic bases may be made by the reaction of an alkoxybenzoyl chloride with the amino alcohol, HOCH₂CXYNHZ, in an inert solvent, such as benzene. Other methods of ester formation will occur to those skilled in the art, so the examples given below are for illustrative purposes only, as we do not wish to limit our claims to these particular methods of ester formation.

Our new amino alcohol esters are practically always obtained as oils. All form salts with acids, among which hydrochloric acid may be mentioned as an example. Most of these amino alcohol esters which were found to be particularly effective as local anesthetics form crystalline hydrochlorides, so purification was effected by recrystallization of the hydrochlorides. Since the hydrochlorides of most of these amino alcohol esters are fairly soluble in water, the hydrochlorides may be used for making aqueous solutions of the anesthetics. In some cases where the water solubility of the anesthetic is not sufficient, it is possible to use other substances, such as propylene glycol, as the solvent. Propylene glycol also serves as a solvent for many of the free anesthetic bases. Other substances, such as olive oil and peanut oil, can serve as solvents for many of the free anesthetic bases, when it is desired to have these in a non-aqueous medium.

When the free base is desired, it may be obtained conveniently from the reaction mixture in which it is formed, from a solution of the purified hydrochloride, or from the solution of any soluble salt, by making the solution basic, extracting with a volatile solvent, such as ether, and evaporating the solvent. The salts of the anesthetic bases may be prepared by treating the free base, preferably in a solvent, with the appropriate acid. In our study we found iso-propyl ether to be a particularly valuable solvent when it is desired to precipitate certain salts of the anesthetic base. Other solvents, such as absolute alcohol, or ether, may be used. Sometimes it is convenient to use a combination of solvents. For example, an iso-propyl ether solution of a free base can be treated with an alcohol solution of an acid and, if necessary, an excess of iso-propyl ether added to precipitate the salt of the anesthetic base.

The secondary amino alcohols used as intermediates in this work may be prepared by alkylation of the parent primary amino alcohol, preferably with an alkyl halide. The primary amino alcohols not obtainable commercially were made from the corresponding alpha amino acid by esterification, acetylation, reduction with sodium and butyl alcohol by the method of Barrow and Ferguson (J. Chem. Soc., 1935, 413), and by steam distillation from the reaction mixture. The formed primary amino alcohols were isolated from the steam distillate by acidification of the steam distillate, evaporation to low volume, treatment with alkali, extraction with ether, evaporation of the ether, and distillation of the amino alcohol.

Goldberg (British Patent No. 482,886) describes the formation of monoalkyl derivatives of aminoethanol by refluxing for 24 hours an alcohol solution of aminoethanol and an alkyl halide. In our work we obtained the best results, usually, when we used no solvent and when we added the alkyl halide slowly, with mechanical stirring to ethanolamine, heated on a water bath.

For the alkylation of amino alcohols of the structure HOCH₂CXYNHZ, in which X is an alkyl group or hydrogen and Z is an alkyl group, we usually obtained excellent results by heating together equimolar quantities of alkyl halide and amino alcohol. For convenience, alkyl bromides usually were used. With high molecular weight alkyl groups, such as the dodecyl or octadecyl, it was found advantageous to use alkyl iodides with a solvent, such as dioxane. For very reactive groups, such as the allyl or benzyl, it was found convenient to use the alkyl chloride. Although the allyl group is, strictly speaking, an alkenyl radical and the benzyl group is an alalkyl radical, both groups are classed in this application as "alkyl" unless there is an express limitation in the specification or claims to prevent the use of such terminology.

To isolate the alkylation product, the reaction mixture was dissolved in dilute hydrochloric acid and any unreacted alkyl halide was separated. The aqueous solution was treated with a great excess of freshly prepared alkali (1:1). The oil which came out of the hot solution was separated, vacuum distilled, and usually was distilled again at atmospheric pressure.

The alkylations at 100° were made in sealed tubes or in flasks immersed in boiling water. The runs at elevated temperatures were made in sealed tubes. In some runs in which the alkyl halide was very active or in which the boiling point of the monoalkylamino alcohol was considerably above that of the unalkylated alcohol, an excess of amino alcohol was found to be advantageous.

In this work temperatures from approximately 20° to 200° were used in individual alkylations. For most runs a temperature of 100° was found satisfactory. In many cases a reaction takes place between the alkyl halide and the amino alcohol at room temperature. For example, when 3.8 grams of practical butyl bromide and 4.45 grams of 2-amino-2-methyl-1-propanol were allowed to stand for eight days, without the application of heat, from the reaction mixture was isolated a small amount (0.99 gram) of 2-n-butylamino-2-methyl-1-propanol, which melted at 67°–69°.

As an illustration of the method we used to prepare the alkyl amino alcohols, we give the following example:

2-n-PROPYLAMINO-1-BUTANOL

To 89.0 grams of 2-amino-1-butanol, in a flask fitted with a reflux condenser and heated in a boiling water bath, was added slowly 136.6 grams of n-propyl bromide (90% pure). The mixture was heated for one hour after all of the propyl bromide had been added. The reaction mixture was then cooled and treated with 400 ml. of water. Considerable oil remained undissolved at the bottom of the container. Upon the addition of 25 ml. of concentrated hydrochloric acid most of this oil dissolved. The remaining oil, mainly unreacted propyl bromide, was separated from the aqueous hydrochloric acid solution and treated with a solution of 135 grams of sodium hydroxide in 135 ml. of water. The oil which separated was vacuum distilled and the distillate was redistilled at atmospheric pressure. The 2-n-propylamino-1-butanol boils at 192°–193°. Calculation for $C_7H_{17}ON$: N, 10.68%. Found 10.44, 10.43%.

Aminoethanol, 2-methyl-2-amino-1-propanol and 2-amino-1-butanol are available commercially, so derivatives of these compounds were studied more fully than were those of other amino alcohols. Since little data on the 2-alkylamino-2-methyl-1-propanols and the 2-alkylamino-1-butanols are available in the literature, some data obtained in our work are included in the following tables:

TABLE A
*Alkylamino alcohols*
2-ALKYLAMINO-2-METHYL-1-PROPANOL

| Radical | Empirical formula | B. P. (cor.) | M. P. (uncor.) | Nitrogen, percent | |
|---|---|---|---|---|---|
| | | | | Calc. | Found |
| | | Degrees | Degrees | | |
| Ethyl | $C_6H_{15}ON$ | 167–170 | 72–73 | 11.95 | 11.91, 11.87 |
| n-Propyl | $C_7H_{17}ON$ | 185–188 | 56–58 | 10.68 | 10.41, 10.43 |
| n-Butyl | $C_8H_{19}ON$ | 202–204 | 68–69 | 9.64 | 9.59, 9.61 |
| n-Amyl | $C_9H_{21}ON$ | 218–221 | 56–59 | 8.80 | 8.50, 8.55 |
| n-Hexyl | $C_{10}H_{23}ON$ | 235–238 | 61–61.5 | 8.08 | 7.82, 7.81 |
| n-Heptyl | $C_{11}H_{25}ON$ | 253–256 | 50–52. | 7.48 | 7.13, 7.14 |
| Iso-butyl | $C_8H_{19}ON$ | 184–187 | 48–49 | 9.64 | 9.52 |
| Iso-amyl | $C_9H_{21}ON$ | 214–217 | 73–74 | 8.80 | 8.48, 8.52 |
| Allyl | $C_7H_{15}ON$ | 183–187 | | 10.84 | 11.20 |
| Benzyl | $C_{11}H_{17}ON$ | 277–280 | 53–57 | 7.81 | 7.55, 7.55 |

TABLE B
*Alkylamino alcohols*
2-ALKYLAMINO-1-BUTANOL

| Radical | Empirical formula | B. P. (cor.) | Nitrogen, percent | |
|---|---|---|---|---|
| | | | Calc. | Found |
| | | Degrees | | |
| Ethyl | $C_6H_{15}ON$ | 177–179 | 11.95 | 11.95, 11.96 |
| n-Propyl | $C_7H_{17}ON$ | 192–193 | 10.68 | 10.44, 10.43 |
| n-Butyl | $C_8H_{19}ON$ | 210–213 | 9.64 | 9.40, 9.47 |
| n-Amyl | $C_9H_{21}ON$ | 227–230 | 8.80 | 8.52, 8.53 |
| n-Hexyl | $C_{10}H_{23}ON$ | 247–252 | | |
| n-Heptyl | $C_{11}H_{25}ON$ | 263–266 | 7.48 | 7.13, 7.15 |
| Iso-butyl | $C_8H_{19}ON$ | 195–198 | 9.64 | 10.01, 10.04 |
| Iso-amyl | $C_9H_{21}ON$ | 221–224 | | |
| Allyl | $C_7H_{15}ON$ | 194–197 | 10.84 | 10.91, 10.87 |
| Benzyl | $C_{11}H_{17}ON$ | 283–285 | 7.81 | 7.51, 7.50 |

Some runs were made with such small amounts of materials that the boiling points may be slightly in error. Since the melting points are for identification and since recrystallization was difficult, the melting points reported are those obtained with the distilled products, without recrystallization.

The following examples of anesthetic formation are illustrative only and are not intended to limit the invention in any respect:

*Example 1—Hydrochloride of β-mono-n-butylamino-β,β-(dimethyl)-ethyl p-n-butoxybenzoate*

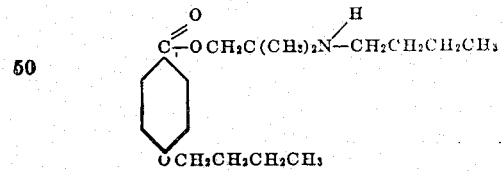

To two hundred and ninety (290) parts by weight of 2-n-butylamino-2-methyl-1-propanol was added three hundred (300) parts by weight of concentrated hydrochloric acid. The formed hydrochloride was evaporated to dryness in a vacuum. To the solid hydrochloride was added four hundred and twenty-five (425) parts of p-butoxybenzoyl chloride. The mixture was heated on a boiling water bath for one hour, with occasional shaking, care being taken to keep moisture from the water bath out of the reaction mixture. The mixture was treated with about seventy (70) times its weight of hot water. The aqueous solution was cooled, filtered, extracted with iso-propyl ether, made alkaline, and again extracted with iso-propyl ether. The iso-propyl ether extract of the alkaline solution was saturated with dry hydrogen chloride. An oily product was formed. Within a few minutes it became crystalline. The precipitate was separated from the iso-propyl ether and recrystallized from acetone. This product, the hydrochloride or β-mono-n-butylamino-β,β-(dimethyl)-ethyl p-butoxybenzoate, is a crystalline solid, M. P. 125°–127°. Calculated for $C_{19}H_{32}O_3NCl$: Cl, 9.91%. Found, 9.66%.

A sample of the hydrochloride was dissolved in about 100 times its weight of water. The solution was made basic with ammonia. The formed oily precipitate was extracted with ether. Upon evaporation of the ether, an oil was left. This oil, β-mono-n-butylamino-β,β-(dimethyl)-ethyl p-n-butoxybenzoate, is insoluble, or nearly so, in water, but is soluble in ether, acetone, alcohol, ethyl acetate, olive oil, peanut oil, and dilute acids, such as hydrochloric and sulfuric.

A weighed sample of the oily β-mono-n-butylamino-β,β-(dimethyl)-ethyl p-butoxybenzoate was dissolved in a measured volume of absolute alcohol to make a solution 0.1 molar in this anesthetic base. An aliquot of this solution was treated with an equimolar quantity of sulfuric acid, dissolved in absolute alcohol. The alcohol was vacuum-evaporated on a water bath. The sulfate of β-n-butylamino-β,β (dimethyl)-ethyl p-n-butoxybenzoate was obtained as a colorless oil, which solidified within a few minutes. The phosphate, borate, citrate, lactate, and picrate of β-n-butylamino-β,β-(dimethyl)-ethyl p-n-butoxybenzoate were prepared by the same procedure as the sulfate. It is possible in some cases to isolate salts of the anesthetic bases by the addition to the solution of the salt some solvent in which the salt is not soluble. For example, the phosphate and sulfate of the above free base were precipitated as oils by the addition of iso-propyl ether to an alcohol solution of the above salts. These oils solidified, on standing. The tannate of β-mono-n-butylamino-β,β-(dimethyl)-ethyl p-n-butoxybenzoate was prepared by mixing ether solutions of the free base and tannic acid, and by evaporation of the ether.

The hydrochloride of β-monobutylamino-β,β-(dimethyl)-ethyl p-butoxybenzoate is a powerful surface anesthetic, as is shown by its tests on a rabbit's cornea and on the human tongue. The intensity of the anesthesia induced following application to the tongue is approximately three times as great as that induced by similar concentrations of cocaine hydrochloride: moreover, anesthesia induced by the former compound persists very much longer than from cocaine hydrochloride.

*Example 2—Hydrochloride of β-mono-n-propyl-aminoethyl p-n-butoxybenzoate*

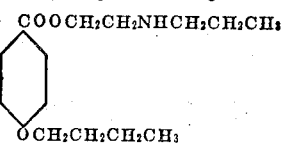

To two hundred and six (206) parts by weight of β-mono-n-propylaminoethanol was added three hundred (300) parts by weight of concentrated hydrochloric acid. The product was evaporated to dryness in a vacuum. To the dry hydrochloride was added four hundred and twenty-five (425) parts by weight of p-butoxybenzoyl chloride. The reaction mixture was heated for about one hour on a boiling water bath under reduced pressure. The mixture then was treated with about one hundred and forty (140) times its weight of boiling water. The aqueous solution was cooled, let stand over night or longer, and extracted with iso-propyl ether. The aqueous layer was made basic with sodium hydroxide and extracted again with iso-propyl ether. Solid sodium chloride was added to get sharp separation between the two layers. The iso-propyl ether layer was saturated with dry hydrogen chloride and the precipitated hydrochloride of β-mono-n-propylaminoethyl p-n-butoxybenzoate was recrystallized from acetone and petroleum ether (B. P. 65°–110°). The product was further purified by recrystallization from anhydrous acetone and petroleum ether, and anhydrous acetone and anhydrous ether. M. P. 110.5°–111.5°. Calculated for $C_{16}H_{26}O_3NCl$: Cl, 11.23%. Found, 11.08%.

Experimental tests on the local anesthetizing effect of β-mono-n-propylaminoethyl p-n-butoxybenzoate hydrochloride were made as follows:

In these tests, 0.1% solution of the above anesthetic was used and compared with 1.0% cocaine hydrochloride, both in aqueous solution. The technic employed was essentially that described in "Experimental Pharmacology," by Sollman and Hanzlik, W. B. Saunders Company, Philadelphia, page 99, using the isolated frog nerve. The results of these experiments show that β-mono-n-propylaminoethyl p-n-butoxybenzoate hydrochloride, in 0.1% solution, was definitely more effective in producing anesthesia than was cocaine hydrochloride in 1.0% solution.

Also, tests were carried out on the rabbit's cornea. In an average of three tests, a more prolonger anesthetic action was obtained with the above anesthetic in 0.1% aqueous solution than with cocaine hydrochloride in 1.0% aqueous solution. No irritation was observed in the rabbit's eye as a result of these tests.

*Example 3—Hydrochloride of β-mono-n-butyl-amino-β,β-(dimethyl)-ethyl o-n-butoxybenzoate*

To twenty-five (25) parts by weight of 2-n-butylamino-2-methyl-1-propanol was added twenty-four (24) parts by weight of concentrated hydrochloric acid. The mixture was evaporated to dryness in a vacuum. To the hydrochloride of 2-n-butylamino-2-methyl-1-propanol was added thirty-six (36) parts by weight of o-butoxybenzoyl chloride. The mixture was heated for one hour on a boiling water bath. The reaction mixture was dissolved in about sixteen (16) times its weight of hot water. The aqueous mixture formed was cooled, filtered, and made basic with sodium hydroxide. The free base of the anesthetic was precipitated as an oil, throughout the alkaline solution. The aqueous alkaline solution was extracted with about one-sixth and about one-twelfth of its volume of iso-propyl ether. This ether extract was saturated with dry hydrogen chloride. The oily product which separated was allowed to stand until it became crystalline. This product, the hydrochloride of β-mono-n-butylamino-β,β-(dimethyl)-ethyl o-butoxybenzoate, after five recrystallizations from anhydrous acetone and anhydrous ether, melted at 91°–94°. Calculated for $C_{19}H_{32}O_3NCl$: Cl, 9.91%. Found, 9.96%. (Note.—The melting point of this product, recrystallized from water, is 69°–71°.)

The hydrochloride of β-monobutylamino-β,β-(dimethyl)-ethyl o-butoxybenzoate is about twice as effective as cocaine hydrochloride as a local anesthetic, as shown by tests on a rabbit's cornea and on the human tongue. The persistence of the anesthesia induced by minimal effective concentration of the former compound is far in excess of that from cocaine hydrochloride. Repeated instillations of 1.0% solution in a rabbit's eye caused no obvious injury. Injected subcutaneously into pigeons, the minimum lethal dose is in excess of 20 mgms. per kg.

*Example 4—Hydrochloride of β-mono-n-amylamino β,β-(dimethyl)-ethyl p-ethoxybenzoate*

To thirty-two (32) parts by weight of 2-n-amylamino-2-methyl-1-propanol was added thirty (30) parts by weight of concentrated hydrochloric acid. The mixture was evaporated to dryness in a vacuum. To the hydrochloride of 2-n-amylamino-2-methyl-1-propanol was added thirty-seven (37) parts by weight of p-ethoxybenzoyl chloride. The mixture was heated on an oil bath at 130° for 30 minutes and at 150° for 5 minutes, with occasional shaking.

The reaction mixture was dissolved in about five (5) times its weight of warm 95% alcohol and this alcohol solution was poured, with stirring, into two volumes of 2.5% sodium hydroxide solution. The oil which rose to the surface was separated and dissolved in three (3) times its volume of alcohol. This alcohol solution was poured, with stirring, into three (3) times its volume of 1.0% sodium hydroxide solution. The oily upper layer was separated from the lower aqueous layer. The 2.5% sodium hydroxide solution was extracted with one-fifth volume of iso-propyl ether. This ether solution was used to extract the 1.0% sodium hydroxide solution and finally was added to the oily layer obtained, as mentioned above. The iso-propyl ether solution of the free base of the anesthetic was separated from a small volume of water, filtered through a dry filter paper, and saturated with dry hydrogen chloride. An oil came out of solution and within a few minutes started to crystallize. The mixture was allowed to stand over night. About two volumes of water were added to the iso-propyl ether, which was mixed with crystals and an oil. The mixture was shaken well and the lower aqueous layer was drawn off. A white crystalline precipitate was left in the ether layer. The crystalline product, the hydrochloride of β-mono-n-amylamino-β,β-(dimethyl)-ethyl p-ethoxybenzoate, was filtered with suction. The yield of crystalline product was increased by making the lower aqueous layer basic with ammonium hydroxide, extraction with iso-propyl ether, and treatment of the ether solution with an equal volume of dilute hydrochloric acid. Crystallization was started by treating the oil which separated with some of the crystalline product obtained earlier in this procedure. The hydrochloride of β-mono-n-amyl-β,β-(dimethyl)-ethyl p-ethoxybenzoate, on recrystallization from acetone and acetone and petroleum ether, melts at 128°–129°. Calculated for $C_{18}H_{30}O_3NCl$: Cl, 10.31%. Found, 10.15%.

The hydrochloride of β-mono-n-amylamino-β,β-(dimethyl)-ethyl p-ethoxybenzoate is at least five times more effective than cocaine hydrochloride, as judged by the dilution necessary to produce surface anesthesia; and in equal concentration with the minimal concentration of cocaine hydrochloride necessary to produce anesthesia, its effect is at least five times more persistent.

Other compounds of the structure

which can be made by one of the methods given above include the following variations of R, X, Y and Z:

| R | X | Y | Z | M. P. hydrochloride, °C. | Formula | Chlorine, percent Calc. | Chlorine, percent Found |
|---|---|---|---|---|---|---|---|
| p—$CH_3$ | H | H | n—$C_4H_9$ | 127.5-129 | $C_{14}H_{22}O_3NCl$ | 12.32 | 12.23 |
| Do | $CH_3$ | H | n—$C_4H_9$ | 154-155 | $C_{15}H_{25}O_3NCl$ | 11.23 | 11.11 |
| Do | H | $C_2H_5$ | n—$C_4H_9$ | | | | |
| p—$C_2H_5$ | H | H | n—$C_4H_9$ | 138-140 | $C_{15}H_{24}O_3NCl$ | 11.75 | 11.61 |
| Do | H | H | n—$C_7H_{15}$ | | | | |
| Do | $CH_3$ | $CH_3$ | n—$C_4H_9$ | | | | |
| Do | $CH_3$ | $CH_3$ | n—$C_4H_9$ | | | | |
| Do | $CH_3$ | $CH_3$ | iso—$C_5H_{11}$ | | | | |
| Do | $CH_3$ | $CH_3$ | n—$C_5H_{13}$ | 135-136 | $C_{19}H_{32}O_3NCl$ | 9.91 | 9.81 |
| Do | $C_2H_5$ | $CH_3$ | n—$C_7H_{15}$ | | | | |
| Do | $CH_3$ | $CH_3$ | $C_6H_5CH_2$ | | | | |
| Do | H | $C_2H_5$ | $C_2H_5$ | 184-185 | $C_{15}H_{24}O_3NCl$ | 11.75 | 11.54 / 11.42 |
| Do | H | $C_2H_5$ | n—$C_4H_9$ | 134-135 | $C_{17}H_{28}O_3NCl$ | 10.75 | 10.82 |
| Do | H | $C_2H_5$ | n—$C_5H_{11}$ | 135-136 | $C_{19}H_{32}O_3NCl$ | 9.91 | 9.88 |
| Do | H | $C_2H_5$ | iso—$C_5H_{11}$ | | | | |
| Do | H | $C_2H_5$ | n—$C_7H_{15}$ | | | | |
| Do | H | $C_2H_5$ | n—$C_{12}H_{25}$ | | | | |
| Do | H | $C_2H_5$ | $C_6H_5CH_2$ | 181-184 | $C_{20}H_{26}O_3NCl$ | 9.74 | 9.64 |
| Do | H | n—$C_4H_9$ | n—$C_4H_9$ | | | | |
| o—$C_2H_5$ | H | H | n—$C_4H_9$ | | | | |
| Do | $CH_3$ | $CH_3$ | n—$C_4H_9$ | 118-120 | $C_{17}H_{28}O_3NCl$ | 10.75 | 10.86 / 10.68 |
| Do | H | $C_2H_5$ | n—$C_4H_9$ | | | | |
| m—$C_2H_5$ | H | H | n—$C_4H_9$ | | | | |
| Do | $CH_3$ | $CH_3$ | n—$C_4H_9$ | 106-108 | $C_{17}H_{28}O_3NCl$ | 10.75 | 10.67 |
| Do | $CH_3$ | $CH_3$ | n—$C_5H_{11}$ | 73-76 | $C_{18}H_{30}O_3NCl$ | 10.31 | 9.82 |
| Do | H | $C_2H_5$ | n—$C_5H_{11}$ | | | | |
| p—n—$C_3H_7$ | H | H | n—$C_4H_9$ | 136-138 | $C_{16}H_{26}O_3NCl$ | 11.23 | 11.27 |
| Do | $CH_3$ | $CH_3$ | n—$C_4H_9$ | 98-100 | $C_{18}H_{30}O_3NCl$ | 10.31 | 10.38 |
| Do | $CH_3$ | $CH_3$ | n—$C_5H_{11}$ | 103-106 | $C_{19}H_{32}O_3NCl$ | 9.91 | 10.06 |
| Do | $CH_3$ | $CH_3$ | n—$C_6H_{13}$ | 118-120 | $C_{20}H_{34}O_3NCl$ | 9.53 | 9.34 |
| Do | H | $C_2H_5$ | n—$C_4H_9$ | 129-131 | $C_{18}H_{30}O_3NCl$ | 10.31 | 10.25 |
| Do | H | $C_2H_5$ | n—$C_6H_{13}$ | 112-114 | $C_{20}H_{34}O_3NCl$ | 9.53 | 9.33 |
| p—iso—$C_3H_7$ | H | H | n—$C_4H_9$ | 118-120 | $C_{16}H_{26}O_3NCl$ | 11.23 | 10.78 |
| Do | $CH_3$ | $CH_3$ | n—$C_4H_9$ | | | | |
| Do | H | $C_2H_5$ | n—$C_4H_9$ | 119-121 | $C_{18}H_{30}O_3NCl$ | 10.31 | 10.29 |
| o—n—$C_3H_7$ | H | H | n—$C_4H_9$ | 135-138 | $C_{16}H_{26}O_3NCl$ | 11.23 | 11.44 |
| Do | $CH_3$ | $CH_3$ | n—$C_4H_9$ | | | | |
| Do | $CH_3$ | $CH_3$ | n—$C_5H_{11}$ | | | | |
| Do | $CH_3$ | $CH_3$ | iso—$C_5H_{11}$ | | | | |
| Do | H | $C_2H_5$ | n—$C_4H_9$ | | | | |
| Do | H | $C_2H_5$ | n—$C_7H_{15}$ | | | | |
| o—iso—$C_3H_7$ | H | H | n—$C_4H_9$ | | | | |
| Do | $CH_3$ | $CH_3$ | n—$C_4H_9$ | | | | |

| R | X | Y | Z | M. P. hydrochloride, °C. | Formula | Chlorine, percent Calc. | Chlorine, percent Found |
|---|---|---|---|---|---|---|---|
| p—n—$C_4H_9$ | H | H | $C_2H_5$ | 135-136 | $C_{15}H_{24}O_3NCl$ | 11.75 | 11.80 |
| Do | H | H | iso—$C_3H_7$ | 168-170 | $C_{16}H_{26}O_3NCl$ | 11.23 | 10.96 |
| Do | H | H | n—$C_4H_9$ | 128-130 | $C_{17}H_{28}O_3NCl$ | 10.75 | 10.56 |
| Do | H | H | iso—$C_4H_9$ | 171.5-172.5 | $C_{17}H_{28}O_3NCl$ | 10.75 | 10.81 |
| Do | H | H | n—$C_5H_{11}$ | 123-125 | $C_{18}H_{30}O_3NCl$ | 10.31 | 10.23 |
| Do | H | H | n—$C_{12}H_{25}$ |  |  |  |  |
| Do | H | H | $CH_2=CHCH_2$ | 94-97 | $C_{16}H_{24}O_3NCl$ | 11.30 | 11.60 |
| Do | $CH_3$ | $CH_3$ | $C_2H_5$ | 136-138 | $C_{17}H_{28}O_3NCl$ | 10.75 | 10.47 |
| Do | $CH_3$ | $CH_3$ | n—$C_3H_7$ | 105-107 | $C_{18}H_{30}O_3NCl$ | 10.31 | 10.24 |
| Do | $CH_3$ | $CH_3$ | iso—$C_4H_9$ |  |  |  |  |
| Do | H | $C_2H_5$ | $C_2H_5$ |  |  |  |  |
| Do | H | $C_2H_5$ | n—$C_4H_9$ | 114-116 | $C_{19}H_{32}O_3NCl$ | 9.91 | 9.85 |
| Do | H | $C_2H_5$ | iso—$C_4H_9$ |  |  |  |  |
| p—iso—$C_4H_9$ | H | H | n—$C_4H_9$ | 150-152 | $C_{17}H_{28}O_3NCl$ | 10.75 | 10.78 |
| o—n—$C_4H_9$ | H | H | $C_2H_5$ |  |  |  |  |
| Do | H | H | n—$C_3H_7$ |  |  |  |  |
| Do | H | H | iso—$C_3H_7$ | 107-109 | $C_{16}H_{26}O_3NCl$ | 11.23 | 11.25 |
| Do | H | H | n—$C_4H_9$ | 85.5-87 | $C_{17}H_{28}O_3NCl$ | 10.75 | 10.68 |
| Do | H | H | iso—$C_4H_9$ | 76-77 | $C_{17}H_{28}O_3NCl$ | 10.75 | 11.05 |
| Do | H | H | n—$C_{12}H_{25}$ |  |  |  |  |
| Do | H | $C_2H_5$ | n—$C_3H_7$ |  |  |  |  |
| m—n—$C_4H_9$ | H | H | n—$C_3H_7$ |  |  |  |  |
| Do | H | H | n—$C_4H_9$ | 109-110 | $C_{17}H_{28}O_3NCl$ | 10.75 | 10.43 |
| Do | H | H | iso—$C_4H_9$ |  |  |  |  |
| p—n—$C_5H_{11}$ | H | H | n—$C_4H_9$ | 124-126 | $C_{18}H_{30}O_3NCl$ | 10.31 | 10.18 |
| Do | $CH_3$ | $CH_3$ | n—$C_4H_9$ |  |  |  |  |
| Do | H | $C_2H_5$ | n—$C_3H_7$ |  |  |  |  |
| o—iso—$C_5H_{11}$ | H | H | n—$C_4H_9$ |  |  |  |  |
| Do | $CH_3$ | $CH_3$ | n—$C_4H_9$ |  |  |  |  |
| m—n—$C_5H_{11}$ | H | H | n—$C_4H_9$ |  |  |  |  |
| Do | $CH_3$ | $CH_3$ | n—$C_3H_7$ |  |  |  |  |
| Do | H | $C_2H_5$ | n—$C_3H_7$ |  |  |  |  |
| p—n—$C_6H_{13}$ | H | H | $C_2H_5$ | 128-129 | $C_{17}H_{28}O_3NCl$ | 10.75 | 10.29 |
| Do | H | H | n—$C_4H_9$ | 120-123 | $C_{19}H_{32}O_3NCl$ | 9.91 | 9.57 |
| Do | $CH_3$ | $CH_3$ | n—$C_4H_9$ |  |  |  |  |
| Do | H | $C_2H_5$ | n—$C_3H_7$ |  |  |  |  |
| p—n—$C_7H_{15}$ | H | H | n—$C_4H_9$ | 129.5-130.5 | $C_{20}H_{34}O_3NCl$ | 9.53 | 9.60 |
| Do | $CH_3$ | $CH_3$ | n—$C_4H_9$ |  |  |  |  |
| Do | $CH_3$ | $CH_3$ | n—$C_4H_9$ |  |  |  |  |
| Do | H | $C_2H_5$ | n—$C_3H_7$ |  |  |  |  |
| Do | H | n—$C_4H_9$ | n—$C_4H_9$ |  |  |  |  |
| p—2—$C_8H_{17}$ | H | H | n—$C_4H_9$ |  |  |  |  |
| p—n—$C_{12}H_{25}$ | H | H | n—$C_4H_9$ | 142-143 | $C_{25}H_{44}O_3NCl$ | 8.02 | 8.09 |
| Do | $CH_3$ | $CH_3$ | n—$C_4H_9$ |  |  |  |  |
| Do | H | $C_2H_5$ | n—$C_4H_9$ |  |  |  |  |
| o—n—$C_{12}H_{25}$ | H | H | n—$C_4H_9$ | 97-99 | $C_{25}H_{44}O_3NCl$ | 8.02 | 8.00 |
| p—$CH_2=CHCH_2$ | H | H | n—$C_4H_9$ |  |  |  |  |

It is to be understood that the melting points given above are for identification only and that we do not wish to limit this application or its claims to compounds with these exact properties, nor to the specific compounds listed, the compounds which we consider to be included in and covered by our invention being those identified in the description of the invention set forth in the specification and in the definition of the invention in the appended claims.

All temperatures in the foregoing tables and elsewhere in the specification are in degrees centigrade.

Each of the compounds listed in the table just above was isolated as the hydrochloride. In a few cases the hydrochloride came out of solution as a solid, but in most cases it was an oil. Some of these oily hydrochlorides solidified within a few seconds. Other hydrochlorides crystallized within a few minutes, while others required days or months. Some of the hydrochlorides did not crystallize, even after standing for several months. Crystallization of some of the oils and gummy solids was brought about by standard methods, using such solvents as acetone, anhydrous acetone, acetone and ligroin, anhydrous acetone and ligroin, anhydrous acetone and anhydrous ether, acetone and absolute alcohol, and absolute alcohol and absolute ether. Some of the hydrochlorides which did not crystallize well were converted into crystalline solids by extracting with a small amount of anhydrous acetone and anhydrous ether, after which treatment they were recrystallized with ease. Melting points and chloride analyses are given for some of the hydrochlorides which crystallized most readily or which, for testing purposes, were desired in a high state of purity.

Practically all of the compounds indicated above were tested for anesthetic action in the form of some salt, usually the hydrochloride and/or the free base, on a rabbit's cornea and/or on the human tongue. A large proportion of the compounds showed distinct anesthetic action. In general, the para derivatives were much more powerful anesthetics than the corresponding ortho derivatives. The anesthetic action of aqueous solutions usually was not very great when either R or Z contained more than six carbons, and was very slight, usually, when R or Z contained more than seven carbons. However, appreciable anesthetic action was shown by at least one compound in which one of the alkyl groups contained twelve carbons. In each of three trials on a rabbit's cornea, β-n-butylaminoethyl o-n-dodecyloxybenzoate hydrochloride showed a distinct anesthetic action, but the isomeric β-n-butylaminoethyl p-n-dodecyloxybenzoate showed no anesthetic action.

We claim:

1. As new products, compounds of the structure

$ROC_6H_4COOCH_2CH_2NHZ$ where R is an alkyl radical containing from 1 to 7 carbons and Z is a primary alkyl radical containing from 2 to 7 carbons.

2. As new products, compounds of the structure

$ROC_6H_4COOCH_2C(CH_3)_2NHZ$ where R is an alkyl radical containing from 1 to 7 carbons and Z is a primary alkyl radical containing from 2 to 7 carbons.

3. As new products, salts of the alkoxybenzoic acid esters of claim 1.

4. As new products, alkoxybenzoic acid ester hydrochlorides of the structure

ROC₆H₄COOCH₂CH₂NHZ·HCl where R is an alkyl radical containing from 1 to 7 carbons and Z is a primary alkyl radical containing from 2 to 7 carbons.

5. As new products, salts of alkoxybenzoic acid esters of claim 2.

6. As new products, alkoxybenzoic acid ester hydrochlorides of the structure

ROC₆H₄COOCH₂C(CH₃)₂NHZ·HCl where R is an alkyl radical containing from 1 to 7 carbons and Z is a primary alkyl radical containing from 2 to 7 carbons.

7. As new products, compounds of the structure

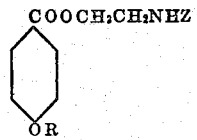

where R is an alkyl radical containing from 1 to 7 carbons and Z is a primary alkyl radical containing from 2 to 7 carbons.

8. As new products, compounds of the structure

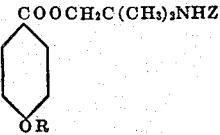

where R is an alkyl radical containing from 1 to 7 carbons and Z is a primary alkyl radical containing from 2 to 7 carbons.

9. As new products, salts of the alkoxybenzoic acid esters of claim 7.

10. As new products, alkoxybenzoic acid ester hydrochlorides of the structure

where R is an alkyl radical containing from 1 to 7 carbons and Z is a primary alkyl radical containing from 2 to 7 carbons.

11. As new products, salts of the alkoxybenzoic acid esters of claim 8.

12. As new products, alkoxybenzoic acid ester hydrochlorides of the structure

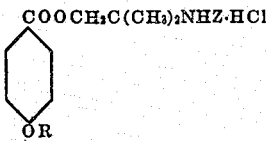

where R is an alkyl radical containing from 1 to 7 carbons and Z is a primary alkyl radical containing from 2 to 7 carbons.

13. As new compounds,

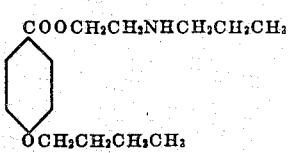

and salts thereof.

14. As new compounds,

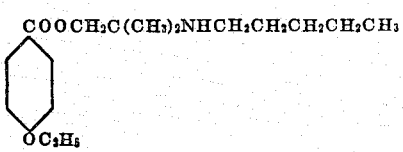

and salts thereof.

15. As new compounds,

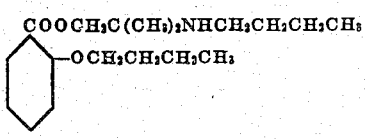

and salts thereof.

16. As new products, compounds of the structure

ROC₆H₄COOCH₂CX₂NHZ where R is an alkyl radical containing from 1 to 7 carbons, Z is a primary alkyl radical containing from 2 to 7 carbons, and X is a member of the group hydrogen and methyl, and salts thereof.

JOHN S. PIERCE.
JASON M. SALSBURY.
JAMES M. FREDERICKSEN.